US010222283B2

(12) United States Patent
Thillainadarajah et al.

(10) Patent No.: US 10,222,283 B2
(45) Date of Patent: Mar. 5, 2019

(54) SYSTEMS AND METHODS OF PROVIDING AUTOMATED FEEDBACK TO A USER USING A SHOE INSOLE ASSEMBLY

(71) Applicant: Smart Skin Technologies Inc., Fredericton (CA)

(72) Inventors: Kumaran Thillainadarajah, Fredericton (CA); Adam Joseph MacDonald, Hanwell (CA); Roua M. Razak, Fredericton (CA)

(73) Assignee: Smart Skin Technologies Inc., Fredericton (CA)

( * ) Notice: Subject to any disclaimer, the term of this patent is extended or adjusted under 35 U.S.C. 154(b) by 279 days.

(21) Appl. No.: 15/094,215

(22) Filed: Apr. 8, 2016

(65) Prior Publication Data
US 2016/0299021 A1  Oct. 13, 2016

Related U.S. Application Data

(60) Provisional application No. 62/144,561, filed on Apr. 8, 2015.

(51) Int. Cl.
*G01L 5/16* (2006.01)
*A43B 17/00* (2006.01)
*A43B 3/00* (2006.01)

(52) U.S. Cl.
CPC .............. *G01L 5/16* (2013.01); *A43B 3/0005* (2013.01); *A43B 17/00* (2013.01)

(58) Field of Classification Search
None
See application file for complete search history.

(56) References Cited

U.S. PATENT DOCUMENTS 5,500,635 A * 3/1996 Mott .................... A43B 1/0072
310/311
5,756,904 A * 5/1998 Oreper ................... A61C 19/05
73/721

(Continued)

FOREIGN PATENT DOCUMENTS

WO    2013/081320 A1   6/2013
WO    2014/081154 A1   5/2014

OTHER PUBLICATIONS

Moticon, "Sensor Insole", 2015 (http://www.moticon.de/products/science-research#science-research-sensor-insole).

(Continued)

*Primary Examiner* — Michael Lebentritt
(74) *Attorney, Agent, or Firm* — Bereskin & Parr LLP/S.E.N.C.R.L., s.r.l.; Isis E. Caulder

(57) ABSTRACT

Various systems and methods for providing automated feedback to a user using a shoe insole assembly are disclosed. In one example embodiment, a shoe insole assembly shaped to be positioned within a footwear and shaped to conform to the contour of the bottom of a human foot when placed within the footwear is provided. The shoe insole assembly comprises a pressure-sensing circuit for determining a pressure profile exerted on the shoe insole assembly by the human foot and for generating data signals corresponding to the pressure profile, a control circuit for processing the data signals received from the pressure-sensing circuit, and housing for encapsulating the pressure-sensing circuit and the control circuit. The processed signals are used to generate output signals that provide feedback to the user based on the pressure exerted on the shoe insole assembly. The shoe insole assembly of the various embodiments illustrated herein is an integral structure.

18 Claims, 10 Drawing Sheets

(56) References Cited

U.S. PATENT DOCUMENTS

| | | | | |
|---|---|---|---|---|
| 5,815,954 | A | * | 10/1998 | Huang ................... A43B 3/00 36/132 |
| 5,875,571 | A | * | 3/1999 | Huang ................... A43B 3/00 36/132 |
| 7,587,937 | B2 | | 9/2009 | Haselhurst et al. |
| 2002/0198069 | A1 | * | 12/2002 | Snyder .................. A43B 3/00 473/446 |
| 2003/0218537 | A1 | * | 11/2003 | Hoch .................... G06F 3/011 340/524 |
| 2004/0160336 | A1 | * | 8/2004 | Hoch .................... G06F 3/011 340/4.31 |
| 2006/0152377 | A1 | * | 7/2006 | Beebe ................ A43B 3/0005 340/665 |
| 2010/0252345 | A1 | * | 10/2010 | Hoshino ................. B60L 7/18 180/65.31 |
| 2011/0214501 | A1 | * | 9/2011 | Ross ................ A43B 3/0005 73/172 |
| 2014/0200486 | A1 | * | 7/2014 | Bechtel ............. A61B 5/14551 600/592 |
| 2014/0200834 | A1 | | 7/2014 | Ross |
| 2018/0049670 | A1 | * | 2/2018 | Markison ............ A61B 5/1036 |

OTHER PUBLICATIONS

Intelisoles, "Intelisoles", 2015 (http://www.intelisoles.com).
Dr. Scholl's, "Foot Mapping Technology", 2015 (http://www.footmapping.ca).

* cited by examiner

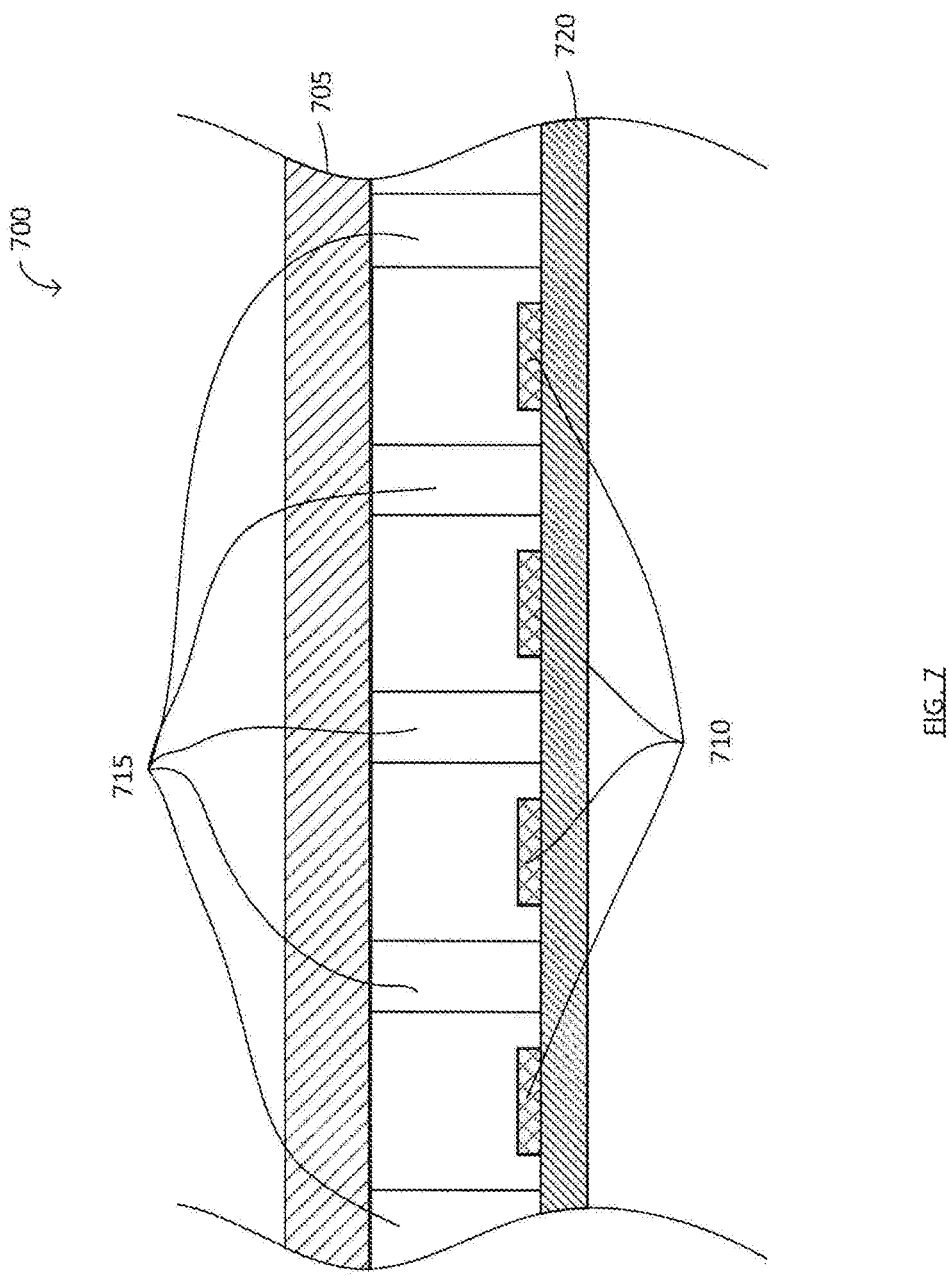

SYSTEMS AND METHODS OF PROVIDING AUTOMATED FEEDBACK TO A USER USING A SHOE INSOLE ASSEMBLY

CROSS-REFERENCE TO RELATED APPLICATIONS

This application claims the benefit of 35 U.S.C. 119 based on the priority of U.S. Provisional Patent Application 62/144,561, filed Apr. 8, 2015 which is incorporated herein in its entirety by reference.

FIELD

The described embodiments relate to systems and methods for providing automated feedback to a user, and in particular, systems and methods for providing automated feedback to a user using a shoe insole assembly.

BACKGROUND

User input devices for capturing pressure profiles are typically inaccurate, expensive and inefficient. There is a need to improve as well as to expand the applicability of such user input devices.

SUMMARY

In one aspect, in at least one embodiment described herein, there is provided a shoe insole assembly shaped to be positioned within a footwear and shaped to conform to the contour of the bottom of a human foot when placed within the footwear. The shoe insole assembly comprises a pressure-sensing circuit for determining a pressure profile exerted on the shoe insole assembly by the human foot and generating data signals corresponding to the pressure profile; a control circuit coupled to the pressure-sensing circuit, the control circuit comprising control electronics for receiving and processing the data signals corresponding to the pressure profile to generate processed pressure data signals; and a housing encapsulating the pressure-sensing circuit and the control circuit, the housing having a top surface for contacting the bottom of the human foot. The shoe insole assembly of the various embodiments illustrated herein is an integral structure.

In various embodiments, the control circuit comprises a communications module for transmission of the processed pressure data signals from the control circuit to an external processing system.

In various embodiments, the pressure-sensing circuit and the control circuit are implemented on a printed circuit board.

In various embodiments, the printed circuit board comprises: a rigid section, wherein when the shoe insole assembly is positioned within the footwear and contacts the bottom of the human foot, the rigid section underlies the heel of the human foot; and a flexible section extending from the rigid section, wherein when the shoe insole assembly is positioned within the footwear and contacts the bottom of the human foot, the flexible section underlies rest of the human foot.

In various embodiments, the pressure-sensing circuit comprises: a plurality of pressure sensors implemented on the printed circuit board; and a plurality of traces connecting each pressure sensor to the control circuit on the rigid section of the printed circuit board, the plurality of traces configured to carry the data signals from the plurality of pressure sensors to the control circuit.

In various embodiments, the plurality of pressure sensors are implemented on a top layer of the printed circuit board and the plurality of traces are implemented on at least one additional layer of the printed circuit board.

In various embodiments, the control circuit comprises at least one multiplexer and the plurality of traces carry the data signals from the plurality of pressure sensors to the at least one multiplexer.

In various embodiments, the control circuit comprises an internal processing unit coupled to the at least one multiplexer, the internal processing unit being configured to process multiplexed data signals received from the at least one multiplexer and generate the processed pressure data signals.

In various embodiments, the rigid section comprises the control circuit entirely.

In various embodiments, the shoe insole assembly further comprises a component protection assembly, the component protection assembly containing a plurality of compartments for receiving the control electronics of the control circuit.

In various embodiments, the housing further encapsulates the component protection assembly.

In various embodiments, wherein when the shoe insole assembly is positioned within the footwear and contacts the bottom of the human foot, the flexible section of the printed circuit board underlies the longitudinal arch portion of the human foot.

In various embodiments, the housing is at least partially manufactured from a material selected from a group consisting of polyurethane, foam, silicone and urethane.

In another aspect, in at least one embodiment described herein, there is provided a method of providing automated feedback to a user using a shoe insole assembly as defined above or in accordance with the teachings herein. The method comprises: providing the shoe insole assembly to be positioned within the footwear to be warn on the human foot, wherein the shoe insole assembly being an integral structure and comprises a pressure-sensing circuit for determining a pressure profile exerted on the shoe insole assembly by the human foot and generating data signals corresponding to the pressure profile; a control circuit coupled to the pressure-sensing circuit, the control circuit comprising control electronics for receiving and processing the data signals corresponding to the pressure profile to generate processed pressure data signals; and a housing containing the pressure-sensing circuit and the control circuit, the housing having a top surface for contacting the bottom of the human foot. The method further comprises generating data signals corresponding to the pressure profile exerted on the shoe insole assembly; processing the data signals to generate the processed pressure data signals; transmitting the processed pressure data signals by the control circuit to an external processing system located external to the shoe insole assembly; and generating output signals based on the processed pressure data signals at the external processing system, the output signals indicating pressure measurements corresponding to the pressure profile.

In various embodiments, the output signals further indicate yaw, pitch and roll measurements corresponding to the pressure profile.

In various embodiments, the output signals comprise audio feedback. In various other embodiments, the output signals comprise video feedback. In various other embodiments, the output signals comprise haptic feedback.

In various embodiments, the output signals comprise a graphical representation of the pressure measurements. In various other embodiments, the output signals comprise a graphical representation of the yaw, pitch and roll measurements.

In another aspect, in at least one embodiment described herein, there is provided a method of providing automated feedback to a user in a sports training application where the method is based on the methods as defined above or other methods in accordance with the teachings herein.

In another aspect, in at least one embodiment described herein, there is provided a method of providing automated feedback to a user in a rehabilitation application where the method is based on the methods as defined above or other methods in accordance with the teachings herein.

In another aspect, in at least one embodiment described herein, there is provided a method of providing automated feedback to a user in a biomedical treatment application where the method is based on the methods as defined above or other methods in accordance with the teachings herein.

In another aspect, in at least one embodiment described herein, there is provided a method of providing automated feedback to a user in a research application where the method is based on the methods as defined above or other methods in accordance with the teachings herein.

In another aspect, in at least one embodiment described herein, there is provided a system for providing automated feedback to a user using a shoe insole assembly as defined above or in accordance with the teachings herein. The system comprises a shoe insole assembly based on the methods and devices as defined above or other methods and devices in accordance with the teachings herein. The system further comprises an external processing system configured to: receive processed pressure data signals from the control circuit; and generate output signals based on the processed pressure data signals, wherein the output signals indicate pressure measurements corresponding to the pressure profile; and a communications module enabling communication between the shoe insole assembly and the external processing system.

In various embodiments, the external processing system is configured to perform the methods as described above or other methods in accordance with the teachings herein.

In various embodiments, the shoe insole assembly is configured to operate in accordance with the devices and methods defined above or in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding, of the applicant's teachings described herein, reference will now be made, by way of example only, to the accompanying drawings which show at least one exemplary embodiment, and in which:

FIG. 7 illustrates a cross-sectional view of a pressure-sensing circuit of a shoe insole assembly according to an example embodiment;

Figure 1A:
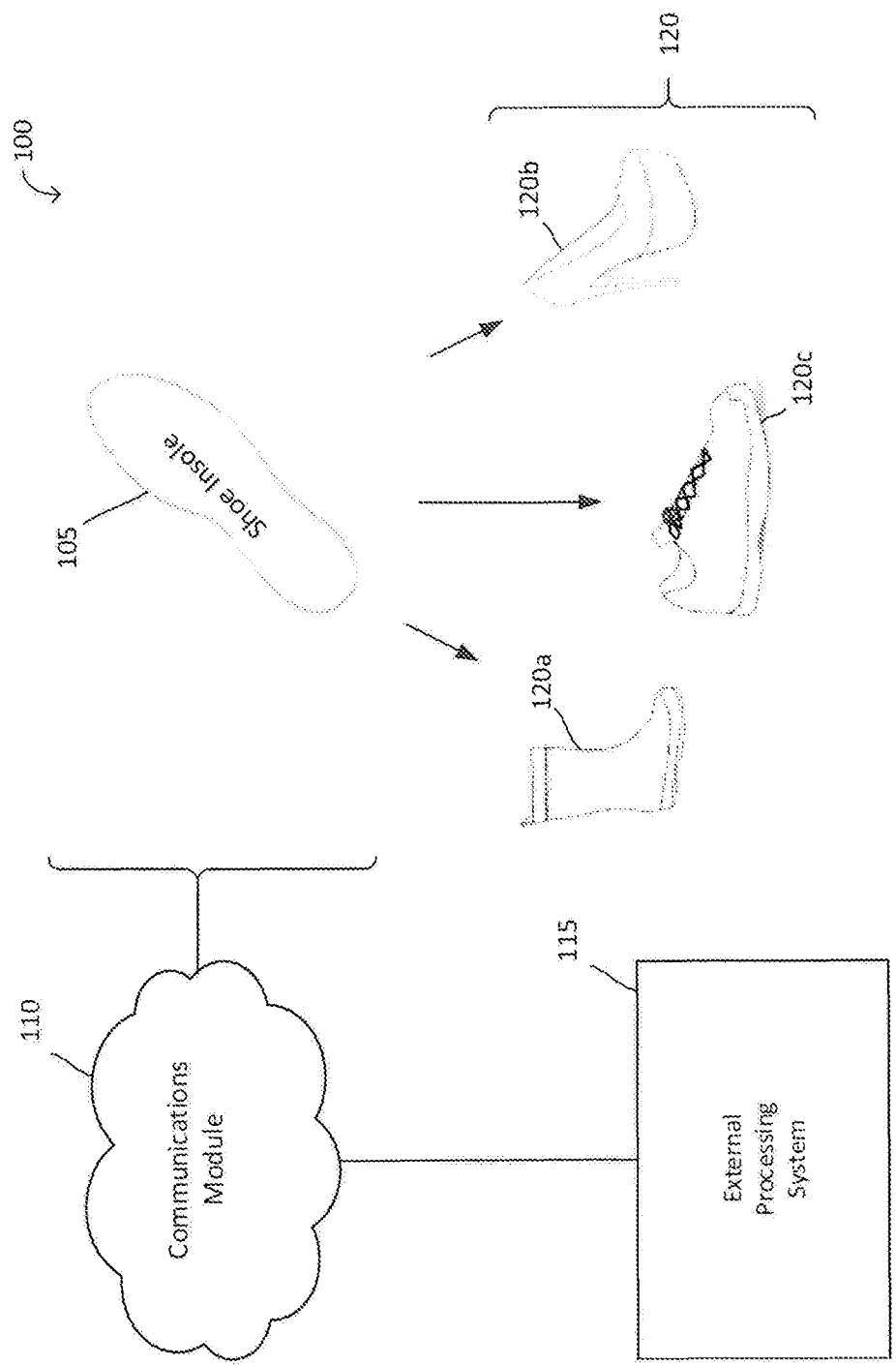
FIG. 1A illustrates a system for providing an automated feedback to a user using a shoe insole assembly according to an example embodiment.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes ail numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage in alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein generally relate to systems and methods of providing an automated feedback to a user using a shoe insole assembly. The shoe insole assembly of various embodiments disclosed herein is an input device shaped to be positioned within a footwear and adapted to conform to the contour of the bottom of a human foot when placed within the footwear.

The shoe insole assembly of the various embodiments disclosed herein includes a high resolution of pressure sensors adapted to be in contact with the bottom of the human foot when the shoe insole assembly is in use. The high resolution of pressure sensors allows for a high resolution pressure profile of the human foot.

The shoe insole assembly of the various embodiments disclosed herein and the pressure profile generated using the shoe insole assembly may have applications in various fields. The shoe insole assembly may be used in medical applications such as, rehabilitation treatments, kinesiology research, foot and gait analysis etc. For example, the pressure profile generated using the shoe insole assembly may be used to identify foot conditions in order to propose treatments using orthotics, physical therapy, and/or surgery.

The shoe insole assembly may further have a use in sports training for optimizing performance in sports, such as running, football, baseball, basketball, hockey, soccer etc. For example, the pressure profile generated using the shoe insole assembly may be used to design orthotics to protect stressed areas of the human foot and/or redistribute abnormal weight to the entire foot when playing sports. This may result in reduced fatigue and risk of injuries, while resulting in improved performance and efficiency.

Reference is first made to FIG. 1A, which illustrates a system 100 for providing an automated feedback to a user according to an example embodiment. System 100 comprises a shoe insole assembly 105, an external processing system 115 and a communications module 110. Shoe insole assembly 105 interfaces with the external processing system 115 via the communications module 110.

The shoe insole assembly 105 is an input device shaped to be positioned within a footwear 120. As will be discussed in greater detail below, the shoe insole assembly 105 is an integral structure in that all the constituent components of the shoe insole assembly 105 are encapsulated within the same structure. Accordingly, the shoe insole assembly 105 is easily transferable between footwears of same dimensions. As illustrated, the shoe insole assembly 105 is transferable between the winter boots 120a, women pumps 120b and running shoes 120c as long as the winter boots 120a, women pumps 120b and running shoes 120c are the same dimensions.

Even though FIG. 1A only illustrates the shoe insole assembly 105 adapted to conform to the contour of the bottom of the right foot, an analogous shoe insole assembly adapted to conform to the contour of the bottom of the left foot may be similarly constructed.

Figure 1B:
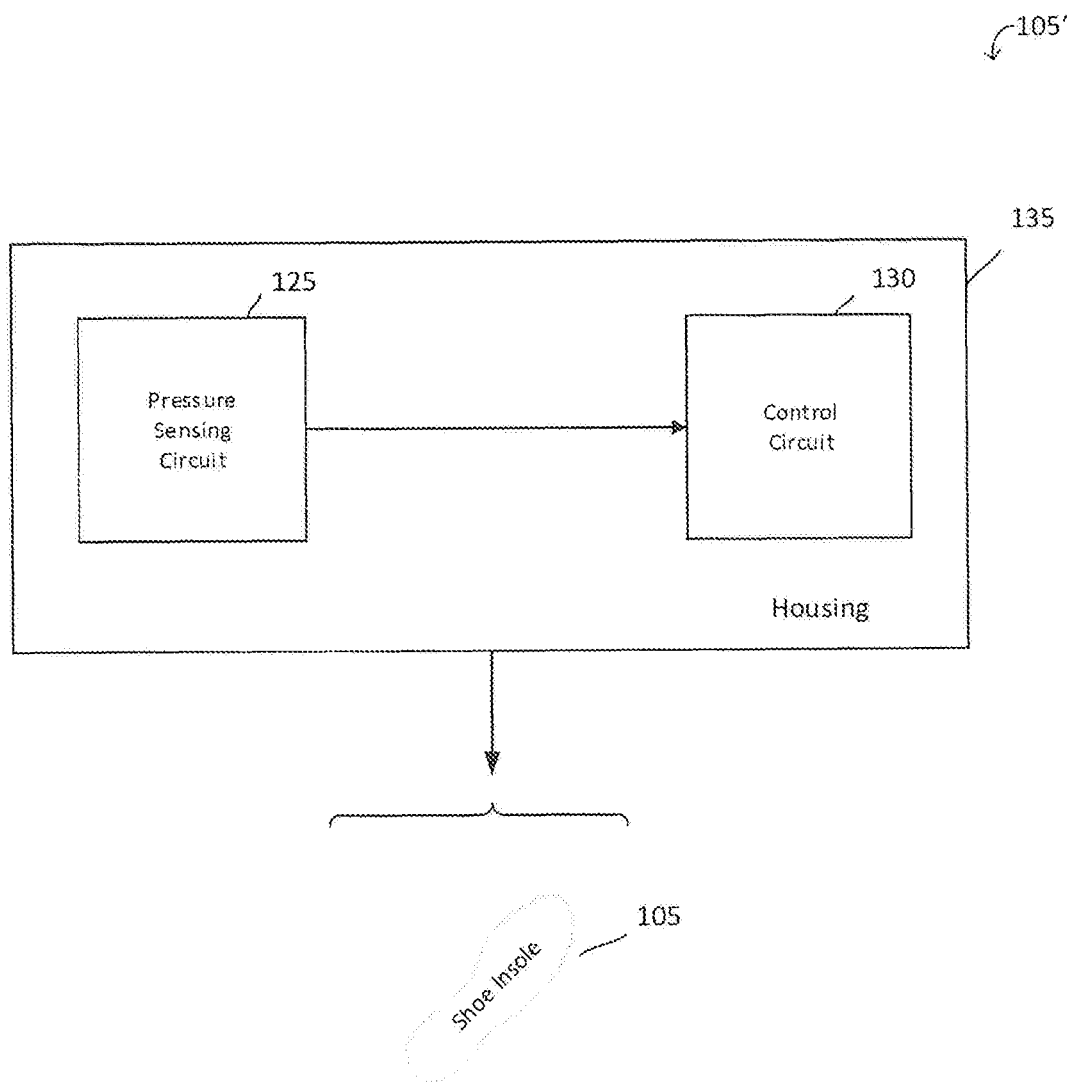
FIG. 1B illustrates a block diagram of a disassembled version of the shoe insole assembly of FIG. 1A according to an example embodiment.

Reference is next made to FIG. 1B, which illustrates a disassembled shoe insole assembly 105' according to an example embodiment. The disassembled shoe insole assembly 105' comprises a housing 135, a pressure-sensing circuit 125 and a control circuit 130.

In operation, the pressure-sensing circuit 125 is configured to determine a pressure profile exerted on the shoe insole assembly by the human foot and generate data signals corresponding to the pressure profile. The control circuit 130 is coupled to the pressure-sensing circuit 125 and comprises control electronics for receiving and processing the data signals corresponding to the pressure profile of the human foot. As will be discussed in detail below, the control circuit 130 of the shoe insole assembly 105' comprises a plurality of electronic components, such as a battery, a processor, a switch, one or more multiplexers etc.

The shoe insole assembly 105 is assembled by mounting the pressure-sensing circuit 125 and the control circuit 130 in a housing 135. Housing 135 is configured to encapsulate the pressure-sensing circuit 125 and the control circuit 130 so that the shoe insole assembly can be easily removed and/or transferred into different footwears having similar dimensions. The housing 135 may be made via a casting process using any material suitable for casting, such as polyurethane (PU), Latex foam, rubber, silicone or urethane, etc. In some other cases, the housing 135 may be manufactured using 3D printing.

In one embodiment, the process of mounting the pressure-sensing circuit 125 and the control circuit 130 in a housing 135 includes wrapping the pressure-sensing circuit 125 and the control circuit 130 in a protective material before commencing the casting process. The wrapped configuration is placed in a mold that conforms to the shape of the desired shoe insole assembly. A desired casting material is then injected into the mold and allowed to settle and harden. The settled casting containing the pressure-sensing circuit 125 and the control circuit 130 forms the housing 135.

In some cases, the protective material used before commencing the casting process is a plastic wrap, such as, for example, Saran™ wrap. Other protective materials preventing the casting material from seeping into the pressure-sensing circuit 125 and the control circuit 130 of the shoe insole assembly 105 may be used.

In some cases, the casting material injected into the mold is a type of a rubber, such as, for example, Reo-Flex, which may only take 15 minutes to harden and may give a soft, flexible feel. In some other cases, the casting material used is urethane, which may result in a stronger housing than rubber. In some further cases, the casting material may be foam.

In some cases, where the pressure-sensing circuit 125 and the control circuit 130 are implemented on a printed circuit board ("PCB"), the PCB may be need to be suspended in air on the inside of the mold so that the casting material flows around it. In such cases, tiny holes may be created along the side of the mold and strings may be used through the tiny holes to create a "hammock" mesh for the PCB to sit inside. The casting material is then injected into the mold and allowed to settle and harden. The settled casting accordingly forms the housing 135 in this case.

The assembled shoe insole assembly 105 can be positioned in a footwear for use as an input device configured to determine and generate pressure profile exerted by the human foot. The housing 135 has a top surface that comes into contact with the bottom of the human foot when the shoe insole assembly 105 is in use.

Reference is again made to FIG. 1A, which illustrates a communications module 110 and an external processing system 115. The communications module 110 may be any wireless network capable of carrying data, including the Internet, satellite, mobile, Wi-Fi, WiMAX, Bluetooth® communications network, passive or active RAD network, infrared light detection and emission communication network, local area network, wide area network, and others, including any combination of these, capable of interfacing with, and enabling communication between the shoe insole assembly 105 and an external processing system 115.

The external processing system 115 may be any system configured to receive and process data received from the shoe insole assembly 105 via the communications module 110. The external processing system 115 may consist of one or more servers, phones, PCs and/or tablets etc.

In some cases, the external processing system 115 processes the received data to generate a three-dimensional model of the pressure profile of the shoe insole assembly 105. In some other cases, the external processing system 115 may process the received data to generate yaw, pitch and roll measurements corresponding to the pressure profile of the human foot.

The external processing system 115 may also be configured to generate output signals based on the measurements corresponding to the pressure profile. The output signals may include audio feedback, video feedback, haptic feedback etc.

In some cases, the external processing system 115 may be configured to process the data received from the shoe insole assembly 105 and compare the received data against pre-stored desired pressure data values to generate feedback for the user.

In some other cases, the external processing system 115 may be configured to generate reports corresponding to the pressure data of the shoe insole assembly 105. For example, the external processing system 115 may be configured to generate a textual or a graphical representation of the pressure measurements and/or the yaw, pitch and roll measurements of the pressure profile of the human foot.

Figure 2:
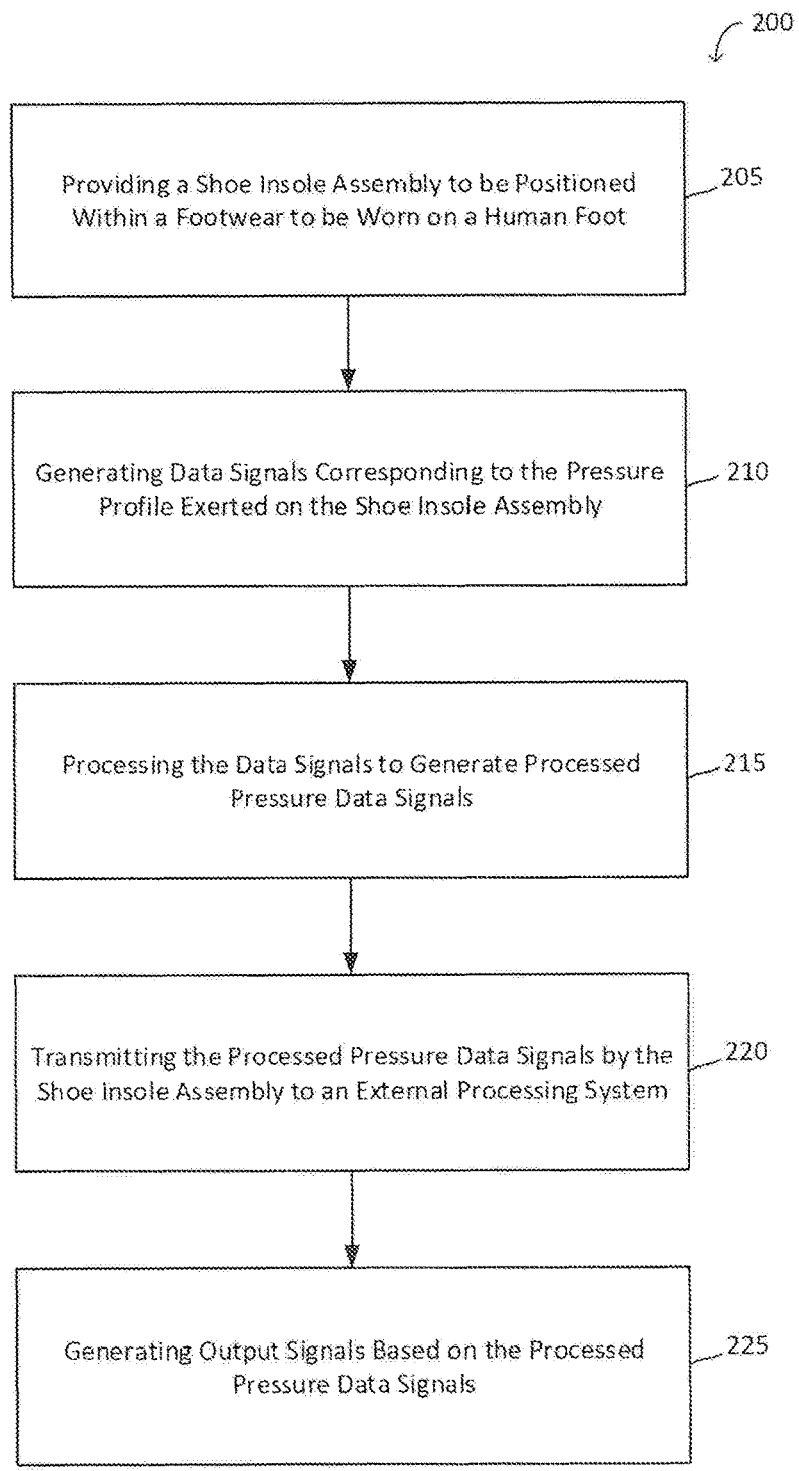
FIG. 2 illustrates a method of providing automated feedback to a user using a shoe insole assembly according to an example embodiment.

Reference is next made to FIG. 2, which illustrates an example embodiment of a method 200 of providing automated feedback to a user in accordance with the teachings herein. The method 200 is facilitated by the various embodiments of a shoe insole assembly described herein.

At 205, a shoe insole assembly shaped to be positioned within an item of footwear and adapted to conform to the contour of the bottom of a human foot when placed within the footwear is provided to a user. The shoe insole assembly is analogous to the shoe insole assemblies 105 and 105' of FIGS. 1A and 1B respectively. In various embodiments disclosed herein, the shoe insole assembly includes a pressure-sensing circuit for determining a pressure profile exerted on the shoe insole assembly by the human foot. The shoe insole assembly also includes control circuit for receiving and processing data signals generated by the pressure-sensing circuit and corresponding to the pressure profile of the human foot to generate processed pressure data signals.

At 210, data signals corresponding to the pressure profile exerted on the shoe insole assembly by the human foot are generated. The data signals are generated by the pressure-sensing, circuit of the shoe insole assembly.

At 215, the data signals corresponding to the pressure profile are processed and processed pressure data signals are generated. The data signals are processed by the control circuit of the shoe insole assembly.

At 220, the processed pressure data signals are transmitted to an external processing system, such as external processing system 115 of FIG. 1A. The processed pressure data signals are transmitted by a communications module, such as a Bluetooth module, of the control circuit of the shoe insole assembly. In some cases, the processed pressure data signals are transmitted to the external processing system in, real-time. In some other cases, the processed pressure data signals are transmitted to the external processing system after some delay. In such cases, the processed pressure data signals are stored on the shoe insole assembly for some time before being transmitted to the external processing system.

At 225, output signals are generated at the external processing system based on the processed pressure data signals received from the shoe insole assembly. The output signals indicate pressure measurements corresponding to the pressure profile exerted on the shoe insole assembly by the human foot.

The output signals may be displayed at the external processing system or provided to the shoe insole assembly by return transmission. For example, in some cases, the output signals include an audio and/or video indication or cues to the user of the shoe insole assembly. In some other cases, the output signals include a haptic feedback to the user of the shoe insole assembly. The output signals may assist the user in achieving a desired objective, such as, improving a particular sports skill, improving range of pressure force application, tracking progress etc.

In one example, for use in the field of rehabilitation, the shoe insole assembly 105 may be configured to generate data signals corresponding to the actual pressure exerted by the human foot while moving (e.g. walking, running etc.) or at rest. In some cases, the data signals may be used by the external processing system 115 to generate a pressure map corresponding to the pressure exerted on the shoe insole assembly by the human foot. A doctor, therapist, nurse or any other professional may observe the pressure map and provide feedback to the user.

In some other cases, the external processing system 115 may be configured to store a database of target or benchmark pressure measurements. In such cases, the external processing system 115 may be used to compare the data signals from the shoe insole assembly with the target values and generate feedback to the user.

Some examples of feedback may include techniques for weight distribution, recommendation for customized orthotics, indication of user's progress etc.

In another example, the shoe insole assembly may be used in the field of sports for sports training. In sports training, a player's interaction with an item of sports equipment or player's pressure profile exerted by the player's foot while participating in the sport may be tracked and real-time feedback may be provided to the player and/or the coaches to improve player's techniques. For example, a player's snowboarding performance may be assessed by measuring the pressure exerted by the foot of the player on the shoe insole assembly provided in the snowboard. The measured values may be observed, and/or compared against optimum values, and appropriate feedback may be provided to the player to improve his/her snowboarding performance.

Figure 3B:
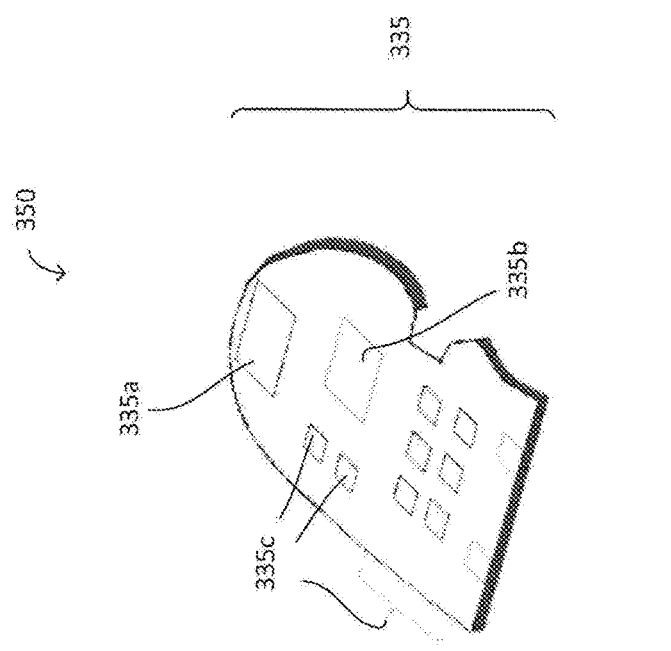
FIG. 3B illustrates a perspective view of a component protection assembly according to an example embodiment.
Figure 3A:
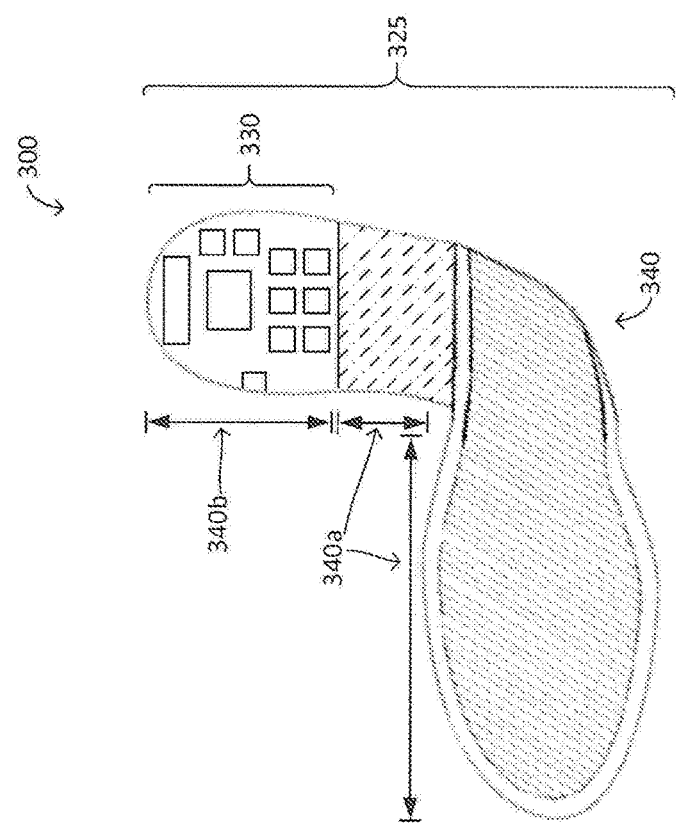
FIG. 3A illustrates a perspective view of a shoe insole assembly according to an example embodiment.

Reference is next made to FIG. 3A, which illustrates a perspective view of a shoe insole assembly 300, such as the shoe insole assembly 105 of FIG. 1A and 105' of FIG. 1B, according to an example embodiment.

The shoe insole assembly of this embodiment is implemented on a printed circuit board 340. The printed circuit board 340 may be any type of a printed circuit board, such as a single sided board, a double sided board, a multi layered board, a flexible board, a rigid board, a rigid-flex board etc. In the various embodiments illustrated herein, the printed circuit board 340 is a rigid-flex printed circuit board having a rigid section 340b and a flexible section 340a, with the flexible section 340a extending from the rigid section 340b.

As illustrated in FIG. 3A, the rigid section 340b of the printed circuit board 340 underlies the heel of the foot and the flexible section 340a of the printed circuit board 340 underlies the rest of the foot when the shoe insole assembly is positioned within the footwear and is in contact with the bottom of the human foot.

As further illustrated in FIG. 3A, the control circuit 330 of the shoe insole assembly, analogous to the control circuit 130 of FIG. 1B, is located in the rigid section 340b of the printed circuit board 340. Since the control circuit 330 comprises a plurality of electronic components, such as battery, multiplexers, switches, etc., the electronic components are positioned under the heel of the foot when the shoe insole assembly is in use. Positioning the control circuit 330 in the rigid section 340b of the printed circuit board 340 and accordingly, having the components underlie the heel of the foot, may have the advantage of protecting the constituent components of the control circuit 330 from getting damaged due to undesirable pressure forces.

In the illustrated embodiment, the pressure-sensing circuit 325, analogous to the pressure-sensing circuit 125 of FIG. 1B, is provided in both the rigid section 340b and the flexible section 340a of the printed circuit board 340 to measure the pressure exerted by the entire human foot, including the heel, the toes, the arch and the ball of the foot etc., on the shoe insole assembly. Positioning the electronic components in the rigid section 340b may have the advantage of maximizing the resolution of the pressure-sensing circuit 125 by having the latter cover a greater area of the shoe insole assembly.

Reference is next made to FIG. 3B, which illustrates a perspective view of a component protection assembly 350 according to an example embodiment. In the various embodiments illustrated herein, the printed circuit board implementing the shoe insole assembly, such as the printed circuit board 340 of FIG. 3A, is encased in part or in whole within the component protection assembly 350 so that the constituent electronics of the printed circuit board 340 can be secured within the component protection assembly 350 and protected from undesirable forces.

As illustrated in FIG. 3B, the component protection assembly 350 includes a plurality of compartments 335 inside the body of the component protection assembly 350. The compartments 335 are independent and isolated from each other and each and every compartment constitutes a closed space for receiving, an electronic component of the control circuit 330 of the shoe insole assembly 300. For example, the component protection assembly 350 consists of a compartment 335a for receiving a communication module, such as a Bluetooth module. Similarly, compartment 335b of the component protection assembly 350 may be used for receiving an internal processing unit and compartments 335c of the component protection assembly 350 may be used for receiving multiplexers.

The component protection assembly 350 may be manufactured to have compartments 335 on both sides of the assembly 350. In the various embodiments illustrated herein, the component protection assembly 350 is manufactured to have a compartment 335 on the underside of the component protection assembly 350 to receive a battery. In some other embodiments, more than one compartment 335 may be provided on the underside of the component protection assembly 350, which may be used to receive other electronic components.

In the illustrated embodiment, where the control circuit 330 of the shoe insole assembly is provided in the rigid section 340b of the printed circuit board 340 and the rigid section 340b underlies the heel of the human foot, the component protection assembly 350 is dimensioned to correspond to the dimensions of the rigid section 340b of the printed circuit board 340.

The component protection assembly 350 is further manufactured to contain an appropriate number and dimensions of constituent compartments 335 corresponding to the number of electronic components in the control circuit 330 that are desired to be protected using the component protection assembly 350.

The resulting component protection assembly 350 is used to overlay the rigid section 340b of the printed circuit board 340 and the electronic components of the control circuit 330 implemented in the rigid section 340b are secured in their corresponding compartments 335.

As can be appreciated, the component protection assembly 350 of FIG. 3B is for illustration purposes only. In other embodiments, where the control circuit 330 of the shoe insole assembly is not implemented in the rigid section 340b of the printed circuit board, or where the rigid section 340b does not underlie the heel of the human foot when the shoe insole assembly is in use, the dimension and/or configuration of the compartments of the component protection assembly 350 may differ from the illustrated embodiment.

In some cases, the component protection assembly 350 may have a larger dimension than that illustrated in FIG. 3B. In some other cases, the component protection assembly 350 may have a smaller dimension than that illustrated in FIG. 3B. In some further cases, the component protection assembly 350 may have a different shape than that illustrated in FIG. 3B and may have dimensions corresponding to more or less area of the shoe insole assembly. In various cases, the number and dimensions of the compartments 335 of the component protection assembly 350 may also differ than the illustrated embodiment.

In embodiments of the shoe insole assembly where the component protection assembly 350 is used, the housing of the shoe insole assembly, such as the housing 135 of FIG. 1B, also includes the component protection assembly 350. In such embodiments, the entire assembly comprising of the pressure-sensing circuit 325, the control circuit 330 and the component protection assembly 350 overlaying the control circuit 330 are wrapped using a protective material before placing in a mold for casting and accordingly, manufacturing the housing of the shoe insole assembly. The casting process is discussed in detail above.

Figure 4B:
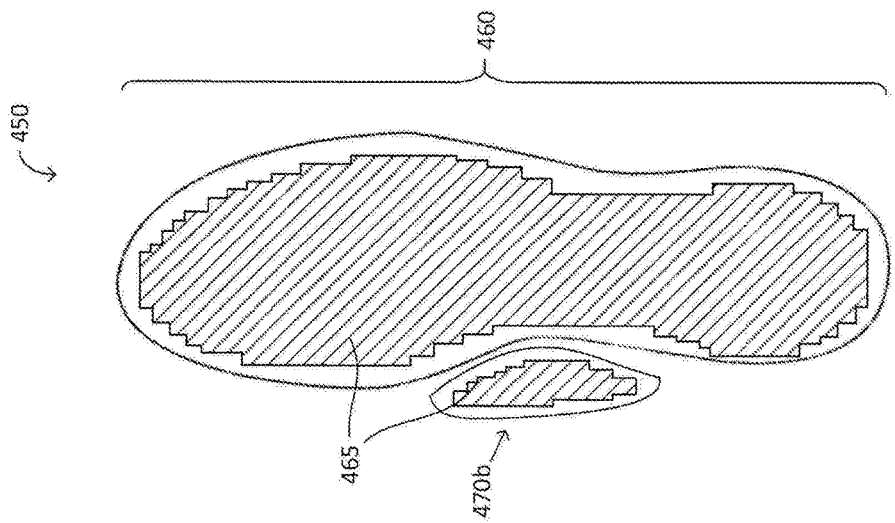
FIG. 4B illustrates a top view of a printed circuit board implementing a shoe insole assembly according to an example embodiment.
Figure 4A:
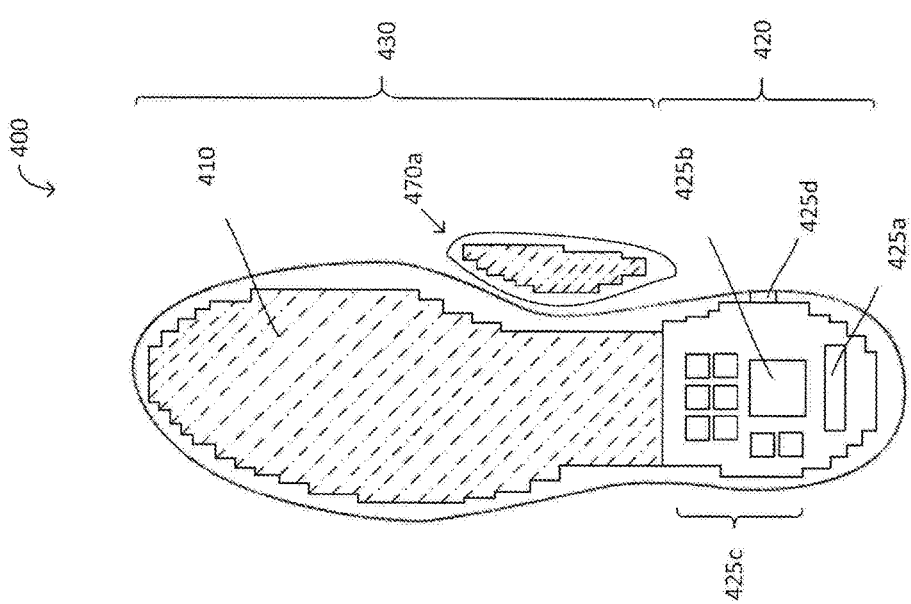
FIG. 4A illustrates a bottom view of a printed circuit board implementing a shoe insole assembly according to an example embodiment.

Reference is next made to FIGS. 4A and 4B, which illustrate a bottom view 400 and a top view 450, respectively, of a printed circuit board, such as the printed circuit board 340 of FIG. 3A, implementing the shoe insole assembly according to an example embodiment.

Referring first to FIG. 4B, the top view 450 of the printed circuit board illustrates a portion 460 of a pressure-sensing circuit, analogous to pressure-sensing circuit 125 of FIG. 1B. Portion 460 of the pressure-sensing circuit includes pressure sensors 465 that are configured to generate a pressure profile of the human foot when the shoe insole assembly is in use.

Pressure sensors 465 may include any components that can be used to measure pressure forces exerted by the human foot. Some examples of pressure sensors 465 may include piezoresistive strain gauge sensors, capacitive sensors, electromagnetic sensors, piezoelectric sensors, optical sensors, potentiometric sensors, grapheme sensors, micro-electromechanical ("MEMS") sensors etc.

The number of pressure sensors 465 used on the shoe insole assembly dictates the resolution and accuracy of the resulting pressure profile detected by the pressure-sensing circuit. In at least one embodiment, the number of pressure sensors 465 used in the shoe insole assembly is 256.

Reference is next made to FIG. 4A, which illustrates the bottom view 400 of the printed circuit board, such as the printed circuit board 340 of FIG. 3A, according to an example embodiment. The bottom view 400 illustrates another portion 430 of a pressure-sensing circuit, analogous to pressure-sensing circuit 125 of FIG. 1B, and a portion 420 of a control circuit, analogous to control circuit 140 of FIG. 1B. Portion 430 includes traces 410 for conducting pressure data signals from the pressure-sensing circuit to the control circuit of the shoe insole assembly.

Portion 420 of the control circuit includes electronic components configured to process the pressure data signals received from the pressure-sensing circuit of the shoe insole assembly. Portion 420 of the control circuit may also include electronic components configured to transfer the processed signals to an external processing unit. Portion 420 of the control circuit may further include electronic components configured to control other operations of the shoe insole assembly, such as switching the shoe insole assembly on or off, monitoring the power circuitry used in the shoe insole assembly etc. In the illustrated embodiment, portion 420 includes a communication module 425a, such as a Bluetooth module, an internal processing unit 425b, a plurality of multiplexers 425c, and a switch 425d.

As illustrated in both FIGS. 4A and 4B, and various other embodiments illustrated herein, portions 430 and 460 of the pressure-sensing circuit also extend to the longitudinal arch portions 470a, 470b of the human foot so that the pressure exerted by the arch portions is also included in the pressure profile generated by the pressure-sensing circuit of the shoe insole assembly.

Figure 5:
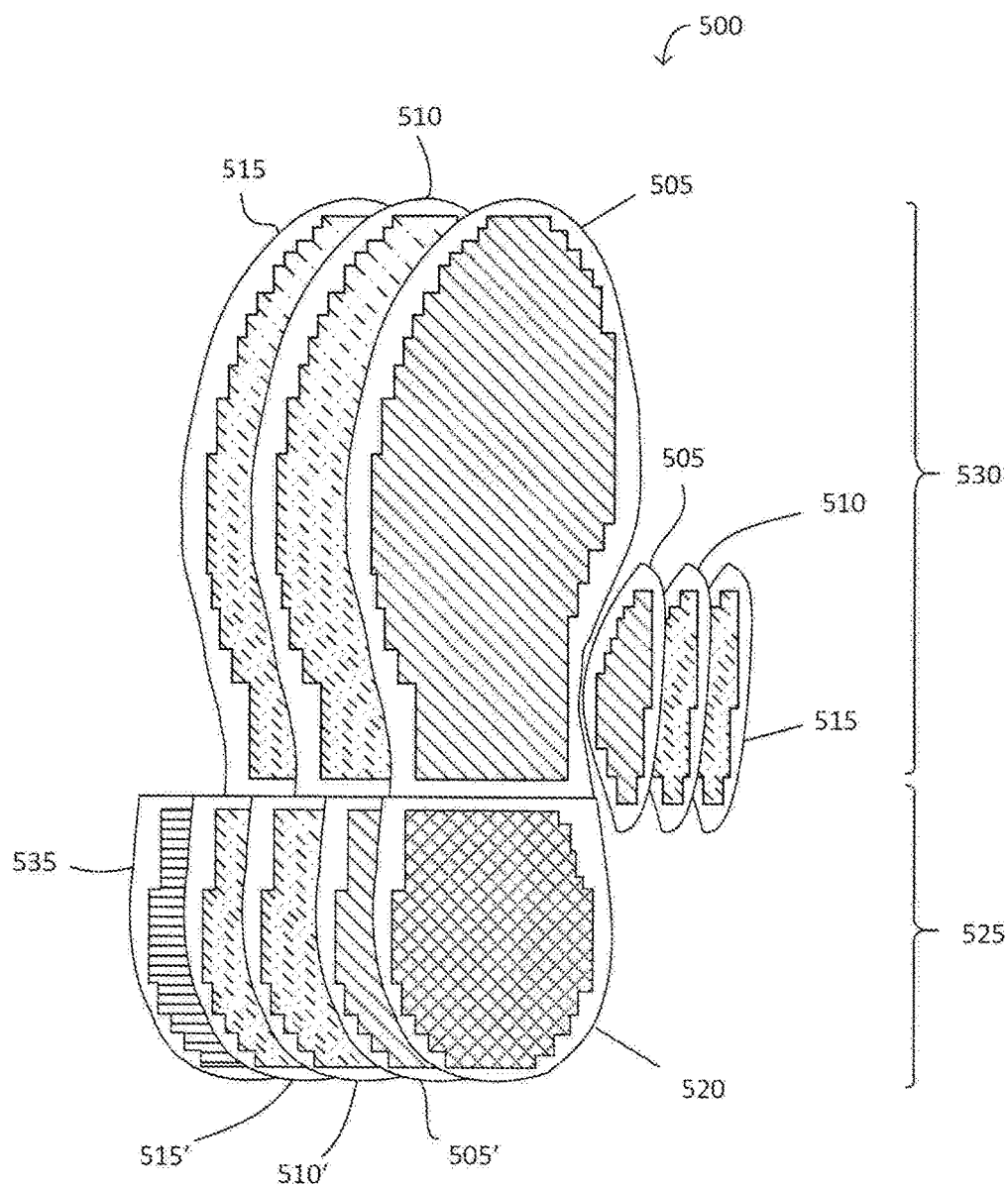
FIG. 5 illustrates an exploded view of a multi-layered printed circuit board implementing a shoe insole assembly according to an example embodiment.

Reference is next made to FIG. 5, which illustrates an exploded view 500 of a printed circuit board implementing a shoe insole assembly, such as the printed circuit board 340 implementing the shoe insole assembly 300 of FIG. 3A, according to an example embodiment. Similar to the printed circuit board 340 of FIG. 3A, the printed circuit board of this embodiment also comprises a rigid section 525 and a flexible section 530.

As illustrated in FIG. 5, the printed circuit board is a multi-layer printed circuit board, where the flexible section 530 of the printed circuit board and the rigid section 525 of the printed circuit board consist of different numbers of layers.

In the illustrated embodiment, the flexible section 530 of the printed circuit board is a three layered printed circuit board consisting of a first flex layer 505, a second flex layer 510 and a third flex layer 515. The rigid section 525 of the printed circuit board is a five layered board consisting of a first rigid layer 520, a second rigid layer 505', a third rigid layer 510', a fourth rigid layer 515' and a fifth rigid layer 535.

In the illustrated embodiment, the second rigid layer 505', the third rigid layer 510' and the fourth rigid layer 515' are extensions of the first flex layer 505, the second flex layer 510 and the third flex layer 515.

As can be appreciated, the number of layers of the printed circuit board illustrated herein is an example only. In some other embodiments, more or less than the illustrated number of layers can be used to implement the rigid and the flexible sections of the printed circuit board. The number of layers used in the printed circuit board tends to be directly proportional to the number or resolution of the pressure sensors implemented on the printed circuit board. In cases where a high resolution of pressure sensors is implemented on the printed circuit board, the number of layers required in the printed circuit board may increase to accommodate the large number of pressure sensors and their routing requirements.

Referring back to FIG. 5, the first flex layer 505 and the first rigid layer 520 consist of pressure sensors, such as pressure sensors 465 of FIG. 4B, to detect the presence of force exerted by a human foot on the top surface of the shoe insole assembly. The first rigid layer 520 consists of pressure sensors for the heel portion of the human foot, and the first flex layer 505 consists of pressure sensors for the remaining portion of the human foot, including the longitudinal arch portion. In the various embodiments illustrated herein, the pressure sensors implemented on the first flex layer 505 and the first rigid layer 520 are uniformly distributed.

The second flex layer 510 and the third flex layer 515 consist of traces for connecting and carrying data signals from the pressure sensors of the first flex layer 505 to the control circuit of the shoe insole assembly. In embodiments where the control circuit of the shoe insole assembly is implemented on the rigid section of the printed circuit board, as illustrated herein, the traces connect the pressure sensors of the first flex layer 505 to rigid section 525 of the printed circuit board. The traces of the various embodiments illustrated herein may be implemented using vias, such as through hole vias, bind vias, buried vias etc.

The second rigid layer 505', the third rigid layer 510' and the fourth rigid layer 515', which are extensions of the first flex layer 505, the second flex layer 510 and the third flex layer 515, respectively, also consist of traces for connecting and carrying data signals from the pressure sensors of the first rigid layer 520 to the control circuit.

The fifth rigid layer 535 is the bottom layer of the rigid section 525 and comprises electronic components of the control circuit of the shoe insole assembly. The traces of the second flex layer 510, the third flex layer 515, the second rigid layer 505', the third rigid layer 510' and the fourth rigid layer 515' carry the pressure data signals from the pressure sensors to the electronic components mounted on the fifth rigid layer 535.

In at least one embodiment, the number of pressure sensors implemented in the first flex layer 505 of FIG. 5 is 192 and the number of pressure sensors implemented in the first rigid layer 520 of FIG. 5 is 84.

In some embodiments, the narrowest, width of the printed circuit board (i.e. at the boundary between the rigid section 525 and the flexible section 530) is around 2", and each trace is 0.006" and requires 0.006" of space around it to be unbreakable. In such embodiments, at least two layers of printed circuit board, analogous to the second flex layer 510 and the third flex layer 515 of FIG. 5, are required to carry traces from the pressure sensors in the flexible section 530 to the control circuit in the rigid section 525.

In some embodiments, the pressure sensors implemented in the first flex layer 505 and the first rigid layer 520 consist of an array of electrode pads, as discussed below with reference to FIGS. 7, 8A, 8B, 9A and 9B. In such embodiments, the traces connecting the electrode pads to the control circuit of the shoe insole assembly may be implemented using through hole vias, such that each electrode pad on the top layer of the multi-layer PCB has one trace extending from the electrode pad to a trace on one of the one or many trace carrying layers using a hole right in the middle of the electrode pad.

With reference to the illustrated embodiment of FIG. 5, the electrode pads of the first flex layer 505 will each have one trace extending from the electrode pad itself to a trace on one of the second flex layer 510 and the third flex layer 515 using a hole right in the middle of the electrode pad. Similarly, the electrode pads of the first rigid layer 520 will each have one trace extending from the electrode pad itself to a trace on one of the second rigid layer 505', the third rigid layer 510' and the fourth rigid layer 515', using a hole right in the middle of the electrode pad.

In the rigid portion 525, each of the traces of the second flex layer 510 and the third flex layer 515 extend down to the third rigid layer 510' and the fourth rigid layer 515', respectively, to reach the control circuit in the rigid section 525. Accordingly, the fourth rigid layer 515' has at least as many holes as the number of electrode pads in the flexible region 530.

In such embodiments, in order to route the electrode pads of the first rigid layer 520 to the control circuit without touching or interfering with the vias of the underlying layers, the electrode pads of the first rigid layer 520 are strategically positioned. In most cases, the electrode pads of the first rigid layer 520 are positioned so that the spacing between the pads matches the space needed to fit an underlying via between them.

Figure 6:
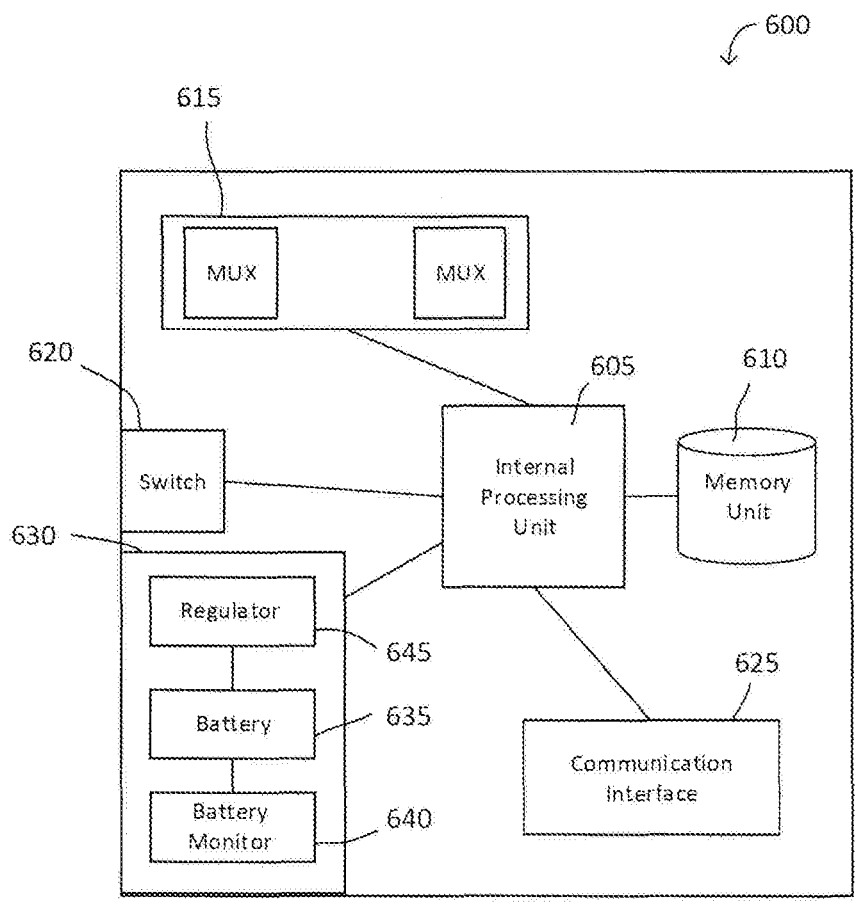
FIG. 6 illustrates a block diagram of a control circuit of a shoe insole assembly according to an example embodiment.

Reference is next made to FIG. 6, which illustrates a block diagram 600 of a control circuit of a shoe insole assembly, such as the control circuit 130 of FIG. 1B, according to an example embodiment. As illustrated, control circuit 600 comprises an internal processing unit 605, a memory unit 610, a multiplexer unit 615, a switch 620, a communication interface 625, and a power circuitry 630.

The internal processing unit 605 controls the operation of the control circuit 600. The internal processing unit 605 may be any controller or digital signal processor that can provide sufficient processing power depending on the configuration and requirements of the control circuit 600. For example, the internal processing unit 605 may be a high performance general processor. In alternative embodiments, the internal processing unit 605 can include more than one processor with each processor being configured to perform a different dedicated task. In various embodiments, the internal processing unit 605 is configured to receive and process pressure data signals provided by a pressure-sensing circuit on the shoe insole assembly.

In various embodiments, the internal processing unit 605 comprises a voltage divider and an analog-to-digital circuitry ("ADC"). In such embodiments, the inputs to the internal processing unit 605, which in some cases may include outputs from each multiplexer in the multiplexer unit 615, are connected to the voltage divider and the ADC on the internal processing unit 605. The resulting sampled voltages are then processed by the internal processing unit 605 to generate conductivity values corresponding to the pressure exerted by the human foot on the pressure-sensing circuit of the shoe insole assembly.

In some embodiments, the internal processing unit 605 further comprises a calibration model which calibrates the conductivity values generated based on the sampled voltages to adjust for conductance uniformity of the materials used in the pressure sensors of the pressure-sensing circuit.

The memory unit 610 can include RAM, ROM, one or more hard drives, one or more flash drives or some other suitable data storage elements such as disk drives, etc. The memory unit 610 is used to store basic operational processes for the control circuit 600. In various embodiments, the memory unit 610 is configured to store pressure data received and/or processed by the internal processing unit 605.

The communication interface 625 may be any network communication interface for facilitating transmission of data from the control circuit 600 to an external processing unit, such as the external processing system 115 of FIG. 1A. For example, the communication interface 625 may consist of a Wi-Fi interface, a Bluetooth interface, an infrared interface etc. The communication interface 625 may be implemented as software, hardware or as a combination thereof.

In at least one embodiment, communication interface 625 facilitates the transmission of data, such as pressure data corresponding to the shoe insole assembly. In another embodiment, the communication interface 625 facilitates the receiving of data, such as feedback data corresponding, by the shoe insole assembly.

In some cases, the communication interface 625 is configured to facilitate transmission of data as soon as it is received by the internal, processing unit 605, i.e. in real-time. In some other cases, the communication interface 625 is configured to facilitate transmission of saved data from the memory unit 610.

Multiplexer unit 615 consists of one or more multiplexers, where each multiplexer is configured to receive pressure data generated by pressure-sensing circuit, such as pressure-sensing circuit 125 of FIG. 1B. Multiplexer unit 615 is configured to receive a plurality of pressure sensor readings, select and forward one reading at a time to the internal processing unit 605. In some embodiments, each multiplexer of the multiplexer unit is a 32-to-1 multiplexer with 32 inputs and 1 output. In some other embodiments, each multiplexer in the multiplexer unit 615 may have a different number of inputs.

In some embodiments, such as, for example, where the number of pressure sensors in the pressure-sensing circuit of the shoe insole assembly is 192, six 32-to-1 multiplexers are used in the multiplexer unit 615. In some other embodiments, such as, for example, where the number of pressure sensors in the pressure-sensing circuit of the shoe insole assembly is 256, eight 32-to-1 multiplexers are used in the multiplexer unit 615.

Power circuitry 630 refers to various components of the control circuit 600, which collaborate to control and manage the power consumption and/or failure associated with the shoe insole assembly. Power circuitry 630 comprises a battery 635, a battery monitor 640 and a regulator 645.

Battery 635 provides the necessary, power to turn on the various components of the shoe insole assembly. In the illustrated embodiment, the power circuitry 630 comprises a thin and light single-cell lithium polymer battery 635. In other embodiments, other types of batteries may be used to power the components of the shoe insole assembly. In some cases, the battery 635 is a rechargeable battery. In some other cases, battery 635 is a non-rechargeable battery. In some cases, the battery is placed under the internal processing unit 605 to optimize the use of space on the control circuit 600, and accordingly the shoe insole assembly.

In the illustrated embodiment, power circuitry 630 further comprises a battery monitor 640 and a regulator 645. Battery monitor 640 is configured to monitor the status of the battery 635. Battery monitor 640 may be configured to monitor voltage, current, temperature, state of health, state of charge etc. associated with the battery 635. Regulator 645 is configured to regulate the voltage and/or current supply to the various components on the shoe insole assembly. Regular 645 may be configured to monitor the voltage, temperature, state of health etc. associated with various components of the shoe insole assembly.

In various embodiments, the power circuitry 630 is switched into operation via power switch 620. Power switch 620 is configured to activate or deactivate the various components and functionalities of the shoe insole assembly. In some embodiments, power switch 620 is a simple on/off switch that may be controlled by the user of the shoe insole assembly or a third-person operator.

Reference is next made to FIG. 7, which illustrates a cross-sectional view 700 of a pressure-sensing circuit, such as the pressure-sensing circuit 125 of FIG. 1B, according to an example embodiment. In the illustrated embodiment, the pressure-sensing circuit 700 comprises a printed circuit board 705, a plurality of sensor pads 710, a plurality of space layers 715 and a top layer 720.

The printed circuit board 705 of the illustrated embodiment is analogous to the printed circuit board 340 of FIG. 3A and printed circuit board 500 of FIG. 5. The printed circuit board 705 may be a rigid board, a flexible board, or a rigid-flex board.

As illustrated, a plurality of sensor pads 710 are formed on the top surface of the printed circuit board 705 and a plurality of space layers 715 extend from the top surface of the printed circuit board 705 to the top layer 720. The space layers 715 create an air-gap between the top layer 720 and the sensor pads 710.

In various embodiments, the top layer 720 is a touch-sensitive layer that remains raised above the sensor pads 710 when the top layer 720 is at rest. When forces are exerted on the shoe insole assembly, the top layer 720 begins to deform. When the pressure is high enough, the top layer 720 deforms to contact one or more of the plurality of sensor pads 710 creating an electrical connection between the top layer 720 and the sensor pads 710. As the pressure further increases, the top layer 720 remains depressed in contact with the sensor pads 710. However, with an increase in the pressure, voltage and/or resistance measured across the top layer 720 and the sensor pads 705 changes and the pressure is accordingly measured. When the pressure is removed, the top layer 720 returns back to the rest state breaking the electrical connection between the top layer 720 and the sensor pads 710.

In some embodiments, pressure is determined by measuring the resistance between the top layer and the sensor pads 710 implemented on the printed circuit board 705. In some other embodiments, pressure is determined by measuring the capacitance between the top layer and the sensor pads 710 implemented on the printed circuit board layer 705.

In various embodiments, each sensor pad 710 consists of a plurality of sensor sub-pads connected to each other with traces between them. For example, in at least one embodiment, each sensor pad 710 consists of four sensor sub-pads connected to each other with traces between them. By implementing each sensor pad using a certain number of sensor sub-pads, the printed circuit board 705 may be made more flexible and less stiff resulting in ease of bending of the printed circuit board 705. This may also prevent any breaking or cracking of the sensor pads 710 and/or the printed circuit board 705 due to pressure forces from the human foot.

Figure 8A:
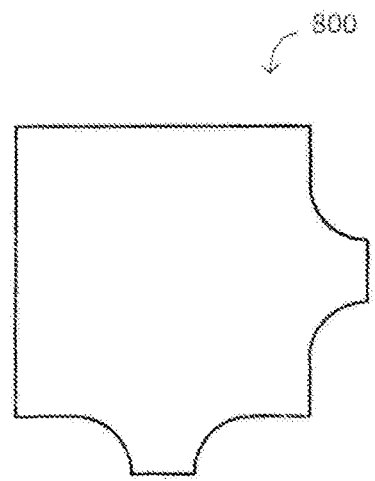
FIG. 8A illustrates a sensor pad according to an example embodiment.
Figure 8B:
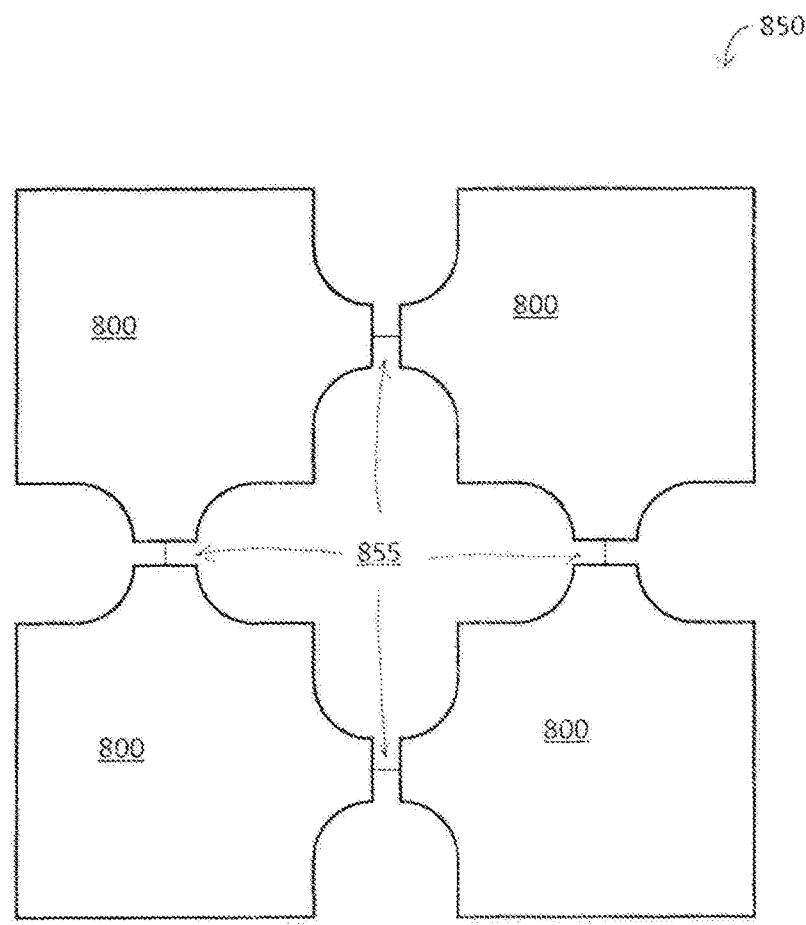
FIG. 8B illustrates a sensor pad according to another example embodiment.
Figure 9A:
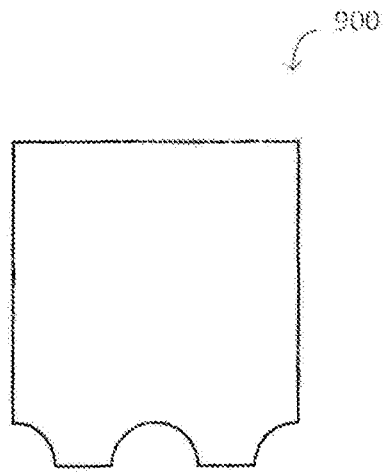
FIG. 9A illustrates a sensor pad according to an example embodiment.

Reference is next made to FIGS. 8A and 9A, which illustrates unique shapes of sensor pads according to various example embodiments. The shapes of the sensor pads may play a role in the flexibility of the sensor pads and, accordingly, the flexibility of the shoe insole assembly. In some embodiments, the sensor pad 800 of FIG. 8A and the sensor pad 900 of FIG. 9A may be implemented as is on a printed circuit board, such as the printed circuit board 705 of FIG. 7 to form a part of the pressure-sensing assembly 700. In some other embodiments, the sensor pad 800 of FIG. 8A and the sensor pad 900 of FIG. 9A form a sensor sub-pad as illustrated in FIGS. 8B and 9B.

FIG. 8B illustrates a sensor pad 850 according to an example embodiment. As illustrated sensor pad 850 consists of four sensor sub-pads 800 of FIG. 8A arranged in a symmetrical manner. Each sensor sub-pad 800 of sensor pad 850 is connected to each other using traces 855.

Figure 9B:
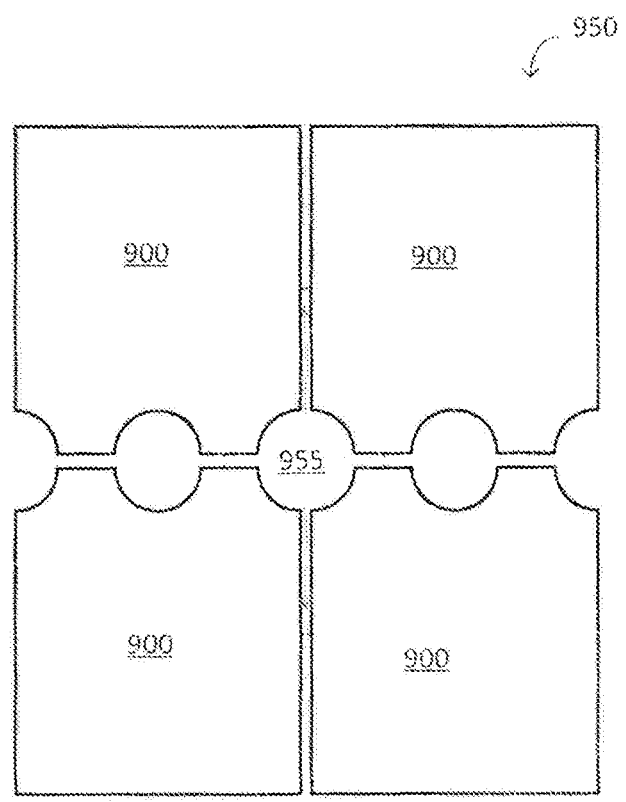
FIG. 9B illustrates a sensor pad according to another example embodiment.

Similarly, FIG. 9B illustrates a sensor pad 950 according to an example embodiment. As illustrated sensor pad 950 consists of four sensor sub-pads 900 of FIG. 9A arranged in a symmetrical manner. Each sensor sub-pad 900 of sensor pad 950 is connected to each other using traces 955.

By implementing the sensor pads 850 and 950 of FIGS. 8B and 9B as a symmetric combination of four sensor sub-pads 800 and 900 respectively, the sensor pads 850 and 950 may provide the benefits of increased flexibility and reduced stiffness than sensor pads of the same dimensions as the sensor pads 850 and 950, such as a rectangular or square shaped sensor pad of the same dimension as sensor pads 850 or 950. In addition, the small length of traces, such as traces 855 and 955 of FIGS. 8B and 9B, may also provide a benefit of a strong sensor pad not prone to breakage when subject to uneven, high and/or continuous pressure forces.

As can be appreciated, other shapes and designs of sensor pads, i.e., other than those illustrated in FIGS. 8A, 8B, 9A and 9B, may be used to reduce the stress on the sensor pads, and accordingly, on the printed circuit board due to pressure forces that may be uneven, very high and/or continuous on the shoe insole assembly.

Various modifications and variations may be made to these example embodiments without departing from the spirit and scope of the embodiments, which is limited only by the appended claims which should be given the broadest interpretation consistent with the description as a whole.

What is claimed is:

1. A shoe insole assembly shaped to be positioned within a footwear and shaped to conform to the contour of the bottom of a human foot when placed within the footwear, the shoe insole assembly comprising:
    a pressure-sensing circuit for determining a pressure profile exerted on the shoe insole assembly by the human foot and generating data signals corresponding to the pressure profile, the pressure-sensing circuit comprising a plurality of electrode pads in an electrode array layer;
    a control circuit coupled to the pressure-sensing circuit, the control circuit comprising control electronics for receiving and processing the data signals corresponding to the pressure profile to generate processed pressure data signals, the control circuit further comprising a plurality of multiplexers, each multiplexer being configured to receive data signals generated by a unique subset of electrode pads; and
    a housing encapsulating the pressure-sensing circuit and the control circuit, the housing having a top surface for contacting the bottom of the human foot;
    wherein the shoe insole assembly is an integral structure.

2. The shoe insole assembly of claim 1, wherein the control circuit comprises a communications module for transmission of the processed pressure data signals from the control circuit to an external processing system.

3. The shoe insole assembly of claim 1, wherein the pressure-sensing circuit and the control circuit are implemented on a printed circuit board.

4. The shoe insole assembly of claim 3, wherein the printed circuit board comprises:
    a rigid section, wherein when the shoe insole assembly is positioned within the footwear and contacts the bottom of the human foot, the rigid section underlies the heel of the human foot; and
    a flexible section extending from the rigid section, wherein when the shoe insole assembly is positioned within the footwear and contacts the bottom of the human foot, the flexible section underlies rest of the human foot.

5. The shoe insole assembly of claim 4, wherein the pressure-sensing circuit comprises:
    a plurality of traces connecting each electrode pad to the control circuit on the rigid section of the printed circuit board, the plurality of traces configured to carry the data signals from the plurality of electrode pads to the control circuit.

6. The shoe insole assembly of claim 5, wherein the plurality of electrode pads are implemented on a top layer of the printed circuit board and the plurality of traces are implemented on at least one additional layer of the printed circuit board.

7. The shoe insole assembly of claim 1, wherein the control circuit comprises an internal processing unit coupled to at least one multiplexer, the internal processing unit being configured to process multiplexed data signals received from the at least one multiplexer and generate the processed pressure data signals.

8. The shoe insole assembly of claim 4, wherein the rigid section comprises the control circuit entirely.

9. The shoe insole assembly of claim 1, further comprising a component protection assembly, the component protection assembly containing a plurality of compartments for receiving the control electronics of the control circuit.

10. The shoe insole assembly of claim 9, wherein the housing further encapsulates the component protection assembly.

11. The shoe insole assembly of claim 4, wherein when the shoe insole assembly is positioned within the footwear and contacts the bottom of the human foot, the flexible section of the printed circuit board underlies the longitudinal arch portion of the human foot.

12. The shoe insole assembly of claim 1, wherein the housing is at least partially manufactured from a material selected from a group consisting of polyurethane, foam, silicone and urethane.

13. A method of providing automated feedback to a user using a shoe insole assembly, the shoe insole assembly being shaped to be positioned within a footwear and shaped to conform to the contour of the bottom of a human foot when placed within the footwear, the method comprising:
providing the shoe insole assembly to be positioned within the footwear to be worn on the human foot, the shoe insole assembly being an integral structure, the shoe insole assembly comprising:
  i. a pressure-sensing circuit for determining a pressure profile exerted on the shoe insole assembly by the human foot and generating data signals corresponding to the pressure profile, the pressure-sensing circuit comprising a plurality of electrode pads in an electrode array layer;
  ii. a control circuit coupled to the pressure-sensing circuit, the control circuit comprising control electronics for receiving and processing the data signals corresponding to the pressure profile to generate processed pressure data signals, the control circuit further comprising a plurality of multiplexers, each multiplexer being configured to receive data signals generated by a unique subset of electrode pads; and
  iii. a housing containing the pressure-sensing circuit and the control circuit, the housing having a top surface for contacting the bottom of the human foot,
generating, by the plurality of electrode pads, data signals corresponding to the pressure profile exerted on the shoe insole assembly;
processing, by the control circuit, the data signals to generate the processed pressure data signals;
transmitting, by the control circuit, the processed pressure data signals by the control circuit to an external processing system located external to the shoe insole assembly; and
generating output signals based on the processed pressure data signals at the external processing system, the output signals indicating pressure measurements corresponding to the pressure profile.

14. The method of claim 13, wherein the output signals further indicate yaw, pitch and roll measurements corresponding to the pressure profile.

15. The method of claim 14, wherein the output signals comprise a graphical representation of the yaw, pitch and roll measurements.

16. The method of claim 13, wherein the output signals further comprises at least one of audio feedback, video feedback, haptic feedback and a graphical representation of the pressure measurements.

17. The method of claim 13, wherein the automated feedback is provided to a user in an application area consisting of one selected from the group of: sports training, rehabilitation, biomedical treatment, research.

18. A system of providing automated feedback to a user using a shoe insole assembly, the shoe insole assembly being shaped to be positioned within a footwear and shaped to conform to the contour of the bottom of a human foot when placed within the footwear, the system comprising:
the shoe insole assembly comprising:
  i. a pressure-sensing circuit for determining a pressure profile exerted on the shoe insole assembly by the human foot and generating data signals corresponding to the pressure profile, the pressure-sensing circuit comprising a plurality of electrode pads in an electrode array layer;
  ii. a control circuit coupled to the pressure-sensing circuit, the control circuit comprising control electronics for receiving and processing the data signals corresponding to the pressure profile to generate processed pressure data signals, the control circuit further comprising a plurality of multiplexers, each multiplexer being configured to receive data signals generated by a unique subset of electrode pads; and
  iii. a housing containing the pressure-sensing circuit and the control circuit, the housing having a top surface for contacting the bottom of the human foot,
an external processing system configured to:
  i. receive processed pressure data signals from the control circuit; and
  ii. generate output signals based on the processed pressure data signals, the output signals indicating pressure measurements corresponding to the pressure profile; and
a communications module enabling communication between the shoe insole assembly and the external processing system.

* * * * *